United States Patent
Parker (10) Patent No.: US 11,593,619 B2
(45) Date of Patent: Feb. 28, 2023

(54) COMPUTER ARCHITECTURE FOR MULTIPLIER-LESS MACHINE LEARNING

(71) Applicant: Raytheon Company, Waltham, MA (US)

(72) Inventor: Michael A. Parker, San Pedro, CA (US)

(73) Assignee: Raytheon Company, Waltham, MA (US)

( * ) Notice: Subject to any disclaimer, the term of this patent is extended or adjusted under 35 U.S.C. 154(b) by 755 days.

(21) Appl. No.: 16/584,322

(22) Filed: Sep. 26, 2019

(65) Prior Publication Data

US 2020/0134429 A1 Apr. 30, 2020

Related U.S. Application Data (60) Provisional application No. 62/752,654, filed on Oct. 30, 2018.

(51) Int. Cl.
*G06N 3/04* (2006.01)
*G06F 17/16* (2006.01)
*G06N 3/063* (2023.01)

(52) U.S. Cl.
CPC ........... *G06N 3/0472* (2013.01); *G06F 17/16* (2013.01); *G06N 3/063* (2013.01)

(58) Field of Classification Search
CPC ....... G06N 3/0472; G06N 3/063; G06F 17/16
USPC ......................................................... 706/15
See application file for complete search history.

(56) References Cited

U.S. PATENT DOCUMENTS 9,824,066 B2 * 11/2017 Joshi ..................... G06F 17/147

FOREIGN PATENT DOCUMENTS

WO 2020091919 5/2020

OTHER PUBLICATIONS

Marchesi, et al., "Fast Neural Networks without Multipliers", IEEE Transactions on Neural Networks, vol. 4, No. 1, Jan. 1993 (Year: 1993).*
"International Application Serial No. PCT US2019 053233, International Preliminary Report on Patentability dated May 14, 2021", 11 pgs.

(Continued)

*Primary Examiner* — Tsu-Chang Lee
(74) *Attorney, Agent, or Firm* — Schwegman Lundberg & Woessner, P.A.

(57) ABSTRACT

A computer architecture for multiplier-less machine learning is disclosed. According to some aspects, a neural network apparatus include processing circuitry and memory. The processing circuitry accesses a plurality of weights for a neural network layer and an input vector for the neural network layer, the input vector comprising a plurality of data values. The processing circuitry provides the plurality of weights and the input vector to an addition layer. The addition layer generates data value-weight pairs and, for each data value-weight pair, creates an input block comprising a sum of the data value and the weight. The processing circuitry sorts the input blocks generated by the addition layer. The processing circuitry cancels any opposite signed input blocks from the sorted input blocks to generate a set of blocks. The processing circuitry outputs a $K^{th}$ largest value from the set of blocks. K is a positive integer.

18 Claims, 7 Drawing Sheets

(56) References Cited

OTHER PUBLICATIONS

"International Application Serial No. PCT US2019 053233, International Search Report dated Dec. 16, 2019", 3 pgs.
"International Application Serial No. PCT US2019 053233, Written Opinion dated Dec. 16, 2019", 11 pgs.
Benjamin, Graham, "Low-Precision Batch-Normalized Activations", Arxiv.Org, Cornell University Library, 201 Olin Library Cornell University Ithaca, NY 14853, XP080748736, (Feb. 27, 2017), 16 pgs.
Miroslav, Skrbek, "Fast Neural Network Implementation", XP055303532, Retrieved from the Internet:http: ncg.felk.cvut.cz research publications nnw.pdf, (Jan. 1, 2000), 17 pgs.

* cited by examiner

COMPUTER ARCHITECTURE FOR MULTIPLIER-LESS MACHINE LEARNING

PRIORITY CLAIM

This application claims priority under 35 U.S.C. § 119 to U.S. Provisional Patent Application Ser. No. 62/752,654, filed Octo. 30, 2018, and titled, "COMPUTER ARCHITECTURE FOR MULTIPLIER-LESS MACHINE LEARNING," which is incorporated herein by reference in its entirety.

TECHNICAL FIELD

Embodiments pertain to computer architecture. Some embodiments relate to a computer architecture for machine learning. Some embodiments relate to a computer architecture for multiplier-less machine learning.

BACKGROUND

Neural networks are useful for many purposes, such as optical character recognition, image recognition, network intruder detection, spam filtering, and the like. New technologies for neural networks may be desirable to perform these and other functions in more efficient ways (e.g., using fewer processing resources or consuming less time).

SUMMARY

The present disclosure generally relates to machines configured to provide neural networks, including computerized variants of such special-purpose machines and improvements to such variants, and to the technologies by which such special-purpose machines become improved compared to other special-purpose machines that provide technology for neural networks. In particular, the present disclosure addresses systems and methods for multiplier-less neural networks.

According to some aspects of the technology described herein, a neural network apparatus include processing circuitry and memory. The processing circuitry accesses a plurality of weights for a neural network layer, each weight being associated with a weight sign. The processing circuitry accesses an input vector for the neural network layer, the input vector comprising a plurality of data values, each data value being associated with a data value sign. The processing circuitry provides the plurality of weights and the input vector to an addition layer. The addition layer generates data value-weight pairs and, for each data value-weight pair, creates an input block comprising a sum of the data value and the weight, and a xor (exclusive or) of the data value sign and the weight sign. The processing circuitry sorts the input blocks generated by the addition layer. The processing circuitry cancels any opposite signed input blocks of the same or similar magnitude from the sorted input blocks to generate a set of blocks. The processing circuitry outputs a $K^{th}$ largest value from the set of blocks, where K is a positive integer.

Other aspects include a method to perform the operations of the processing circuitry above, and a machine-readable medium storing instructions for the processing circuitry to perform the above operations.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As discussed above, neural networks are useful for many purposes, such as optical character recognition, image recognition, network intruder detection, spam filtering, and the like. New technologies for neural networks may be desirable to perform these and other functions in more efficient ways (e.g., using fewer processing resources or consuming less time). One operation that takes up many processing resources, circuit area, and power consumption is multiplication, for example, in convolution layers of a convolution neural network (CNN). Thus, reducing the need for multiplication in a neural network that can accomplish the same functions as a CNN may be desirable. Some aspects of the technology described herein are directed to reducing the need for multiplication in a neural network that can accomplish the functions of a CNN.

Machine learning may be computationally expensive. Many machine learning applications are power limited, whether implemented as an embedded application or in a data center. In recent years, there has been an industry-wide effort to make machine learning more efficient without compromising the accuracy and the quality of the results. A more efficient implementation provides system level benefits of higher computational density, lower power, and lower cost.

Some aspects of the technology described herein solve the following technical problems: providing higher compute density within same power and cost envelop, which is an intense focus within the machine learning community across multiple commercial and defense application; reducing area and power of matrix multiplication operations, which are the core operator of CNN processing used in most machine learning implementations; and reducing or eliminating the use of multipliers in machine learning circuitry.

According to some aspects of the technology described herein, a neural network apparatus includes processing circuitry (e.g., one or more processors, which may be arranged in a processing unit, for example, a CPU (central processing unit) or GPU (graphics processing unit)) and memory. The processing circuitry accesses a plurality of weights for a neural network layer, each weight being associated with a weight sign. The weights are first (or later) converted into a logarithmic form. In some cases, the weights are generated using a neural network utilizing the neural processing techniques described herein.

The processing circuitry accesses an input vector for the neural network layer, the input vector comprising a plurality of data values, each data value being associated with a data value sign. The data values are converted into a logarithmic form. The processing circuitry provides the plurality of weights and the input vector to an addition layer. The addition layer generates data value-weight pairs and, for each data value-weight pair, creates an input block comprising a sum of the data value and the weight, and a xor (exclusive or) of the data value sign and the weight sign. The processing circuitry sorts the input blocks generated by the addition layer. The processing circuitry cancels any opposite signed input blocks of the same or similar magnitude from the sorted input blocks to generate a set of blocks. The processing circuitry outputs a $K^{th}$ largest value from the set of blocks, where K is a positive integer.

Figure 5:
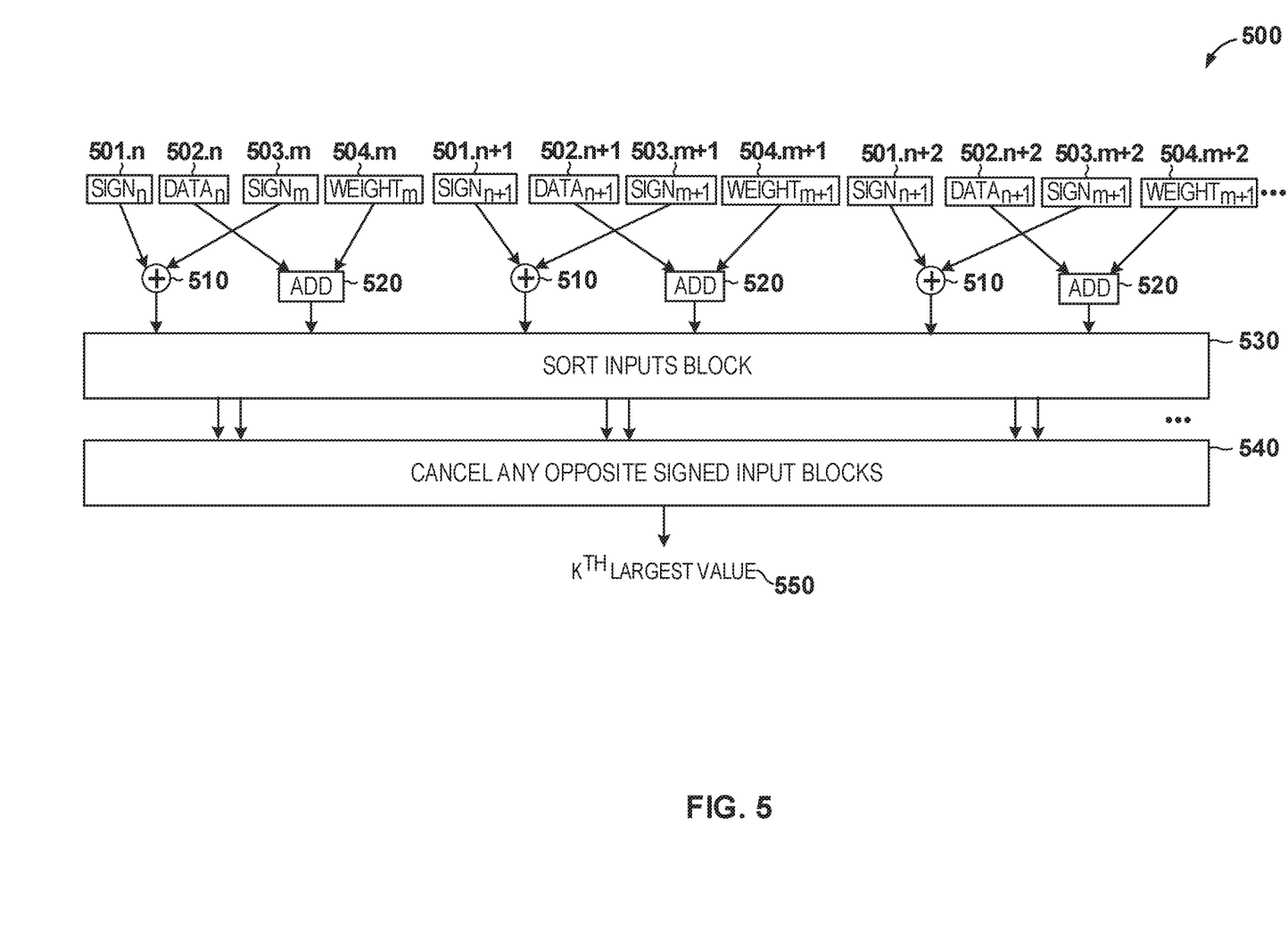
FIG. 5 is a circuit block diagram of circuitry for a layer of a multiplier-less neural network, in accordance with some embodiments.

In some aspects, the operations above are hard-wired into the processing circuitry, for example, using adders and/or sorting circuitry. One example of a circuit block diagram for performing these operations is shown in FIG. 5. In some aspects, code for the operations above is stored in memory, and the processing circuitry carries out the operations by reading the code from the memory.

As described above, the processing circuitry carries out adding and sorting operations, but no multiplication operations. This saves processing time and processing resources, as hard-wired multipliers require large circuit resources and memory, while hard-wired adders may require less circuit area or fewer processing resources. One advantage of some aspects of the technology described herein is that no (or few) multiplication operations are required in the processing of the neural network-reducing the need for costly hard-wired multipliers or costly multiplication operations.

Some aspects of the technology disclosed herein may include one or more of the following features: reduction of area and power intensive multipliers used in CNNs, reduction of memory required, accumulation method for products with logarithmic numerical representation, which is achieved by selection of the Kth largest value (e.g., $K^{th}$ median sort), and accumulation of fully connected layers efficiently implemented using hierarchical sort tree.

Some aspects of the technology disclosed herein provide one or more of the following features: an efficient technique to perform the matrix multiplication used in CNNs, an accumulation functionality that makes eliminating multiplier feasible and attractive, encapsulation of the technology within ASIC (Application-Specific Integrated Circuit) or customized FPGA (Field-Programmable Gate Array) implementation to preserve secrecy.

Figure 1:
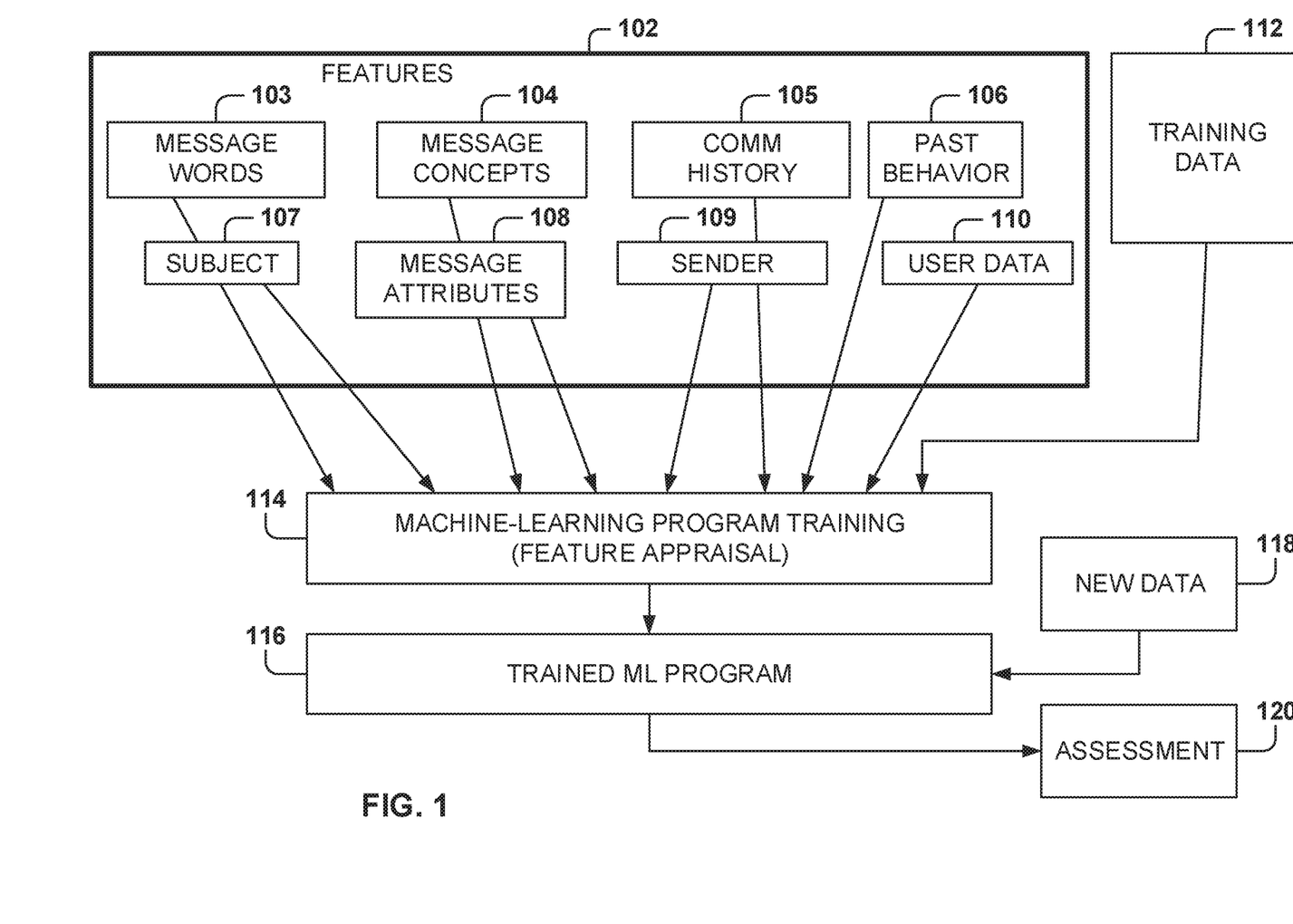
FIG. 1 illustrates the training and use of a machine-learning program, in accordance with some embodiments.

FIG. 1 illustrates the training and use of a machine-learning program, according to some example embodiments. In some example embodiments, machine-learning programs (MLPs), also referred to as machine-learning algorithms or tools, are utilized to perform operations associated with machine learning tasks, such as image recognition or machine translation.

Machine learning is a field of study that gives computers the ability to learn without being explicitly programmed. Machine learning explores the study and construction of algorithms, also referred to herein as tools, which may learn from existing data and make predictions about new data. Such machine-learning tools operate by building a model from example training data 112 in order to make data-driven predictions or decisions expressed as outputs or assessments 120. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange). Regression algorithms aim at quantifying some items (for example, by providing a value that is a real number). The machine-learning algorithms utilize the training data 112 to find correlations among identified features 102 that affect the outcome.

The machine-learning algorithms utilize features 102 for analyzing the data to generate assessments 120. A feature 102 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 102 may be of different types and may include one or more of words of the message 103, message concepts 104, communication history 105, past user behavior 106, subject of the message 107, other message attributes 108, sender 109, and user data 110.

The machine-learning algorithms utilize the training data 112 to find correlations among the identified features 102 that affect the outcome or assessment 120. In some example embodiments, the training data 112 includes labeled data, which is known data for one or more identified features 102 and one or more outcomes, such as detecting communication patterns, detecting the meaning of the message, generating a summary of the message, detecting action items in the message, detecting urgency in the message, detecting a relationship of the user to the sender, calculating score attributes, calculating message scores, etc.

With the training data 112 and the identified features 102, the machine-learning tool is trained at operation 114. The machine-learning tool appraises the value of the features 102 as they correlate to the training data 112. The result of the training is the trained machine-learning program 116.

When the machine-learning program 116 is used to perform an assessment, new data 118 is provided as an input to the trained machine-learning program 116, and the machine-learning program 116 generates the assessment 120 as output. For example, when a message is checked for an action item, the machine-learning program utilizes the message content and message metadata to determine if there is a request for an action in the message.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input.

Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that is has not been trained on. In a second example, a false positive rate or false negative rate may be used to evaluate the models after finalization. In a third example, a delineation between data clusterings is used to select a model that produces the clearest bounds for its clusters of data.

Figure 2:
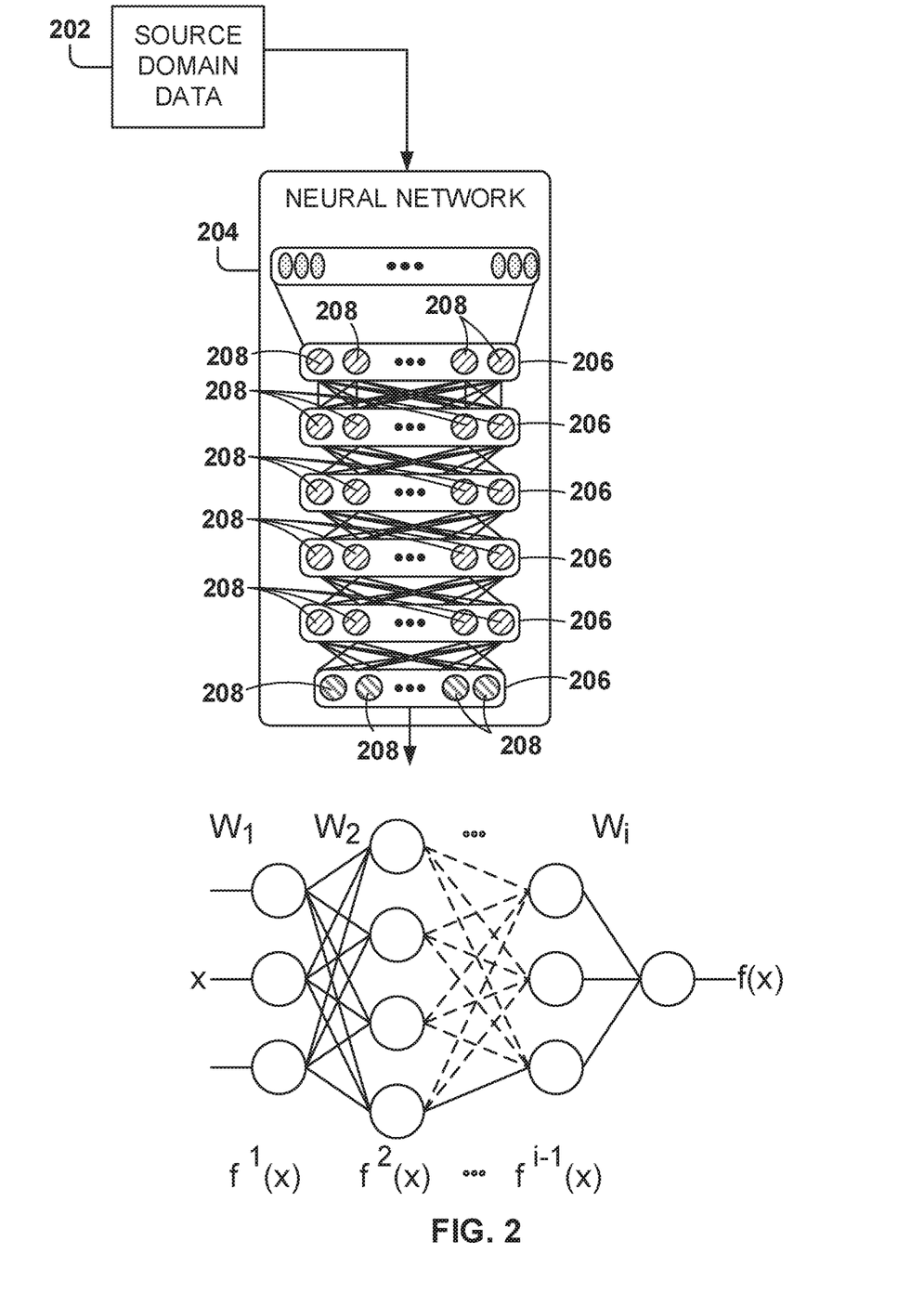
FIG. 2 illustrates an example neural network, in accordance with some embodiments.

FIG. 2 illustrates an example neural network 204, in accordance with some embodiments. As shown, the neural network 204 receives, as input, source domain data 202. The input is passed through a plurality of layers 206 to arrive at an output. Each layer includes multiple neurons 208. The neurons 208 receive input from neurons of a previous layer and apply weights to the values received from those neurons in order to generate a neuron output. The neuron outputs from the final layer 206 are combined to generate the output of the neural network 204.

As illustrated at the bottom of FIG. 2, the input is a vector x. The input is passed through multiple layers 206, where weights $W_1, W_2, \ldots, W_i$ are applied to the input to each layer to arrive $f^1(x), f^2(x), \ldots, f^{i-1}(x)$, until finally the output f(x) is computed.

In some example embodiments, the neural network 204 (e.g., deep learning, deep convolutional, or recurrent neural network) comprises a series of neurons 208, such as Long Short Term Memory (LSTM) nodes, arranged into a network. A neuron 208 is an architectural element used in data processing and artificial intelligence, particularly machine learning, which includes memory that may determine when to "remember" and when to "forget" values held in that memory based on the weights of inputs provided to the given neuron 208. Each of the neurons 208 used herein are configured to accept a predefined number of inputs from other neurons 208 in the neural network 204 to provide relational and sub-relational outputs for the content of the frames being analyzed. Individual neurons 208 may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of feature is related to that of an explanatory variable used in statistical techniques such as linear regression. Further, deep features represent the output of nodes in hidden layers of the deep neural network.

A neural network, sometimes referred to as an artificial neural network, is a computing system/apparatus based on consideration of biological neural networks of animal brains. Such systems/apparatus progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

Figure 3:
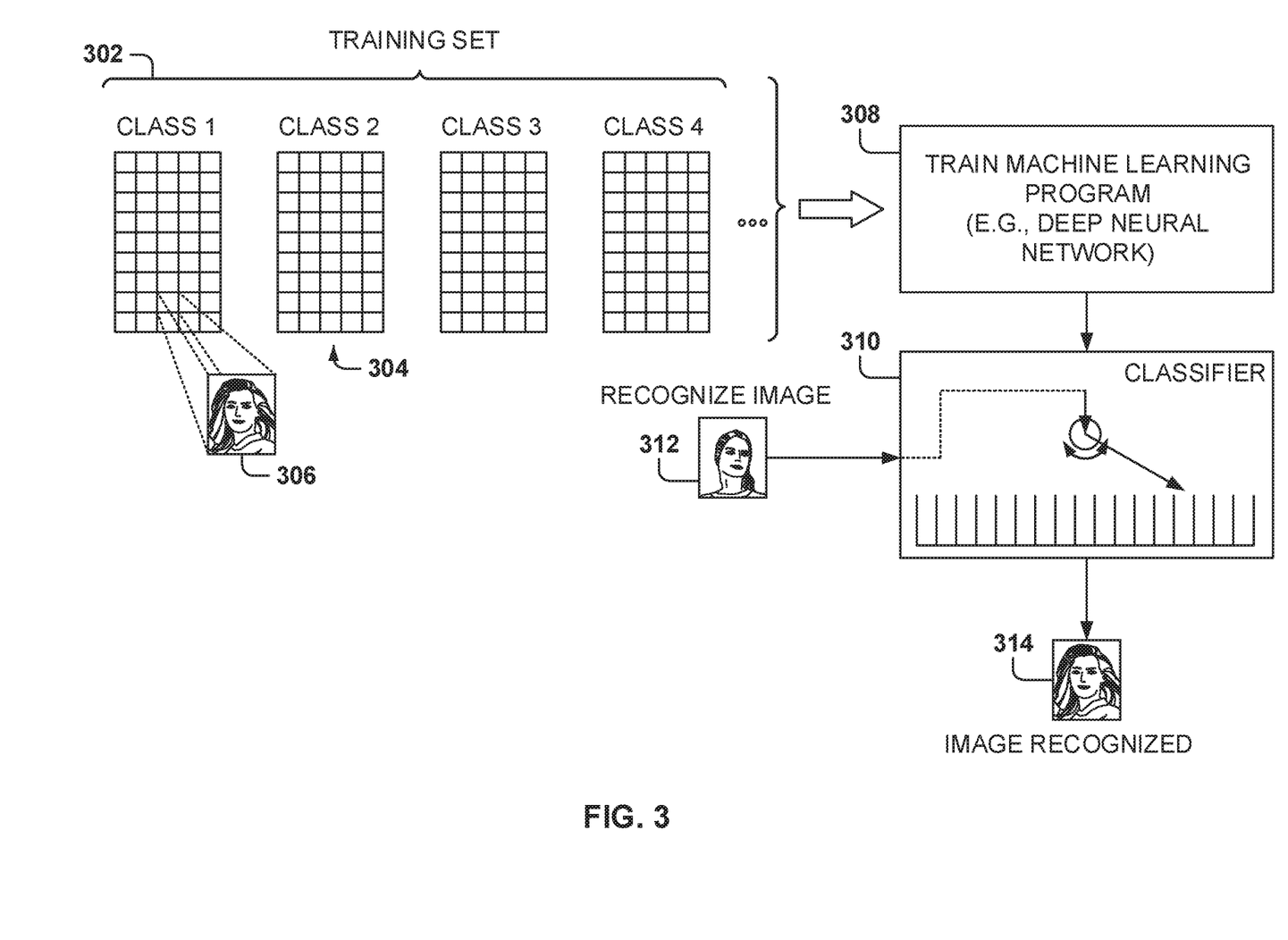
FIG. 3 illustrates the training of an image recognition machine learning program, in accordance with some embodiments.

FIG. 3 illustrates the training of an image recognition machine learning program, in accordance with some embodiments. The machine learning program may be implemented at one or more computing machines. Block 302 illustrates a training set, which includes multiple classes 304. Each class 304 includes multiple images 306 associated with the class. Each class 304 may correspond to a type of object in the image 306 (e.g., a digit 0-9, a man or a woman, a cat or a dog, etc.). In one example, the machine learning program is trained to recognize images of the presidents of the United States, and each class corresponds to each president (e.g., one class corresponds to Donald Trump, one class corresponds to Barack Obama, one class corresponds to George W. Bush, etc.). At block 308 the machine learning program is trained, for example, using a deep neural network. At block 310, the trained classifier, generated by the training of block 308, recognizes an image 312, and at block 314 the image is recognized. For example, if the image 312 is a photograph of Bill Clinton, the classifier recognizes the image as corresponding to Bill Clinton at block 314.

FIG. 3 illustrates the training of a classifier, according to some example embodiments. A machine learning algorithm is designed for recognizing faces, and a training set 302 includes data that maps a sample to a class 304 (e.g., a class includes all the images of purses). The classes may also be referred to as labels. Although embodiments presented herein are presented with reference to object recognition, the same principles may be applied to train machine-learning programs used for recognizing any type of items.

The training set 302 includes a plurality of images 306 for each class 304 (e.g., image 306), and each image is associated with one of the categories to be recognized (e.g., a class). The machine learning program is trained 308 with the training data to generate a classifier 310 operable to recognize images. In some example embodiments, the machine learning program is a DNN.

When an input image 312 is to be recognized, the classifier 310 analyzes the input image 312 to identify the class (e.g., class 314) corresponding to the input image 312.

Figure 4:
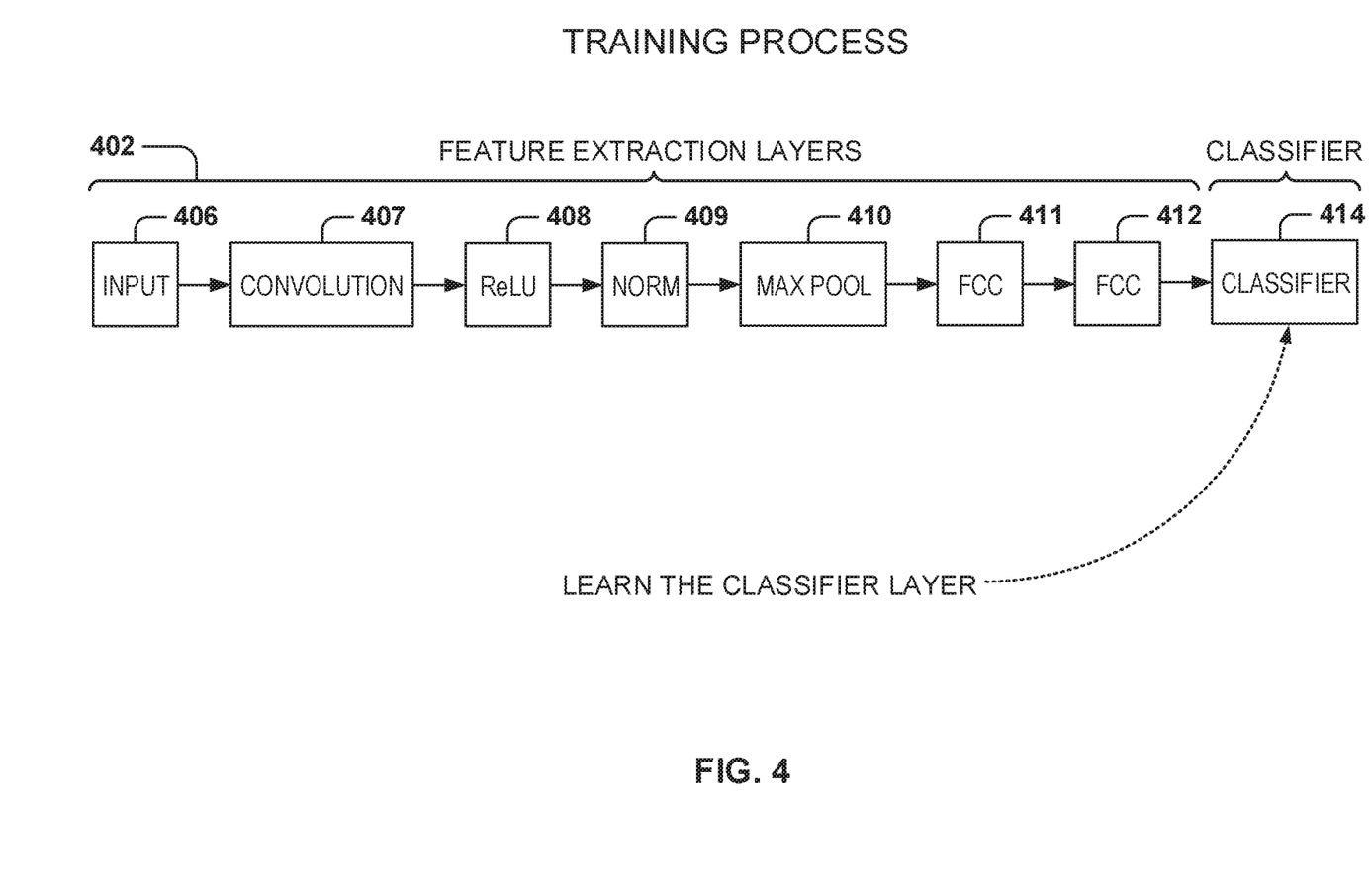
FIG. 4 illustrates the feature-extraction process and classifier training, in accordance with some embodiments.

FIG. 4 illustrates the feature-extraction process and classifier training, according to some example embodiments. Training the classifier may be divided into feature extraction layers 402 and classifier layer 414. Each image is analyzed in sequence by a plurality of layers 406-412 in the feature-extraction layers 402.

With the development of deep convolutional neural networks, the focus in face recognition has been to learn a good face feature space, in which faces of the same person are close to each other, and faces of different persons are far away from each other. For example, the verification task with the LFW (Labeled Faces in the Wild) dataset has been often used for face verification.

Many face identification tasks (e.g., MegaFace and LFW) are based on a similarity comparison between the images in the gallery set and the query set, which is essentially a K-nearest-neighborhood (KNN) method to estimate the person's identity. In the ideal case, there is a good face feature extractor (inter-class distance is always larger than the intra-class distance), and the KNN method is adequate to estimate the person's identity.

Feature extraction is a process to reduce the amount of resources required to describe a large set of data. When performing analysis of complex data, one of the major problems stems from the number of variables involved.

Analysis with a large number of variables generally requires a large amount of memory and computational power, and it may cause a classification algorithm to overfit to training samples and generalize poorly to new samples. Feature extraction is a general term describing methods of constructing combinations of variables to get around these large data-set problems while still describing the data with sufficient accuracy for the desired purpose.

In some example embodiments, feature extraction starts from an initial set of measured data and builds derived values (features) intended to be informative and non-redundant, facilitating the subsequent learning and generalization steps. Further, feature extraction is related to dimensionality reduction, such as be reducing large vectors (sometimes with very sparse data) to smaller vectors capturing the same, or similar, amount of information.

Determining a subset of the initial features is called feature selection. The selected features are expected to contain the relevant information from the input data, so that the desired task can be performed by using this reduced representation instead of the complete initial data. DNN utilizes a stack of layers, where each layer performs a function. For example, the layer could be a convolution, a non-linear transform, the calculation of an average, etc. Eventually this DNN produces outputs by classifier 414. In FIG. 4, the data travels from left to right and the features are extracted. The goal of training the neural network is to find the parameters of all the layers that make them adequate for the desired task.

As shown in FIG. 4, the input 406 is processed through a convolution 407, a rectified linear unit (ReLU) 408, a normalization (norm) layer 409, and a max pooling (max pool) 410. The output from the max pooling 410 is provided to fully connected convolution (FCC) layers 411 and 412, which result in the classifier 414. Max pooling refers to down-sampling by selecting the maximum value in each max pooled region.

In some example embodiments, the structure of each layer is predefined. For example, a convolution layer may contain small convolution kernels and their respective convolution parameters, and a summation layer may calculate the sum, or the weighted sum, of two pixels of the input image. Training assists in defining the weight coefficients for the summation.

One way to improve the performance of DNNs is to identify newer structures for the feature-extraction layers, and another way is by improving the way the parameters are identified at the different layers for accomplishing a desired task. The challenge is that for a typical neural network, there may be millions of parameters to be optimized. Trying to optimize all these parameters from scratch may take hours, days, or even weeks, depending on the amount of computing resources available and the amount of data in the training set.

FIG. 4 describes a max pooling scheme. However, in some aspects of the technology described herein, the max pooling operations are replaced with sorting operations, as described in detail below.

As described above, the weights of FIG. 2 are applied using multiplication. However, according to some aspects of the technology described herein, the weights may be applied (e.g., to a logarithm of a numeric input) using addition instead of multiplication. Some examples of this are described in conjunction with FIGS. 5-6. The use of addition in place of multiplication may make the neural network circuitry more efficient in terms of speed of operation and/or hardware requirements.

FIG. 5 is a circuit block diagram of circuitry 500 for a layer of a multiplier-less neural network, in accordance with some embodiments. The computer architecture of FIG. 5 may be used with some implementations of the technology described herein.

As illustrated, the layer is associated with weights 504. Each weight 504 has a sign 503. The weights 504 (and their signs 503) are determined by training the layer, for example, as one of the layers of a neural network. The input to the circuitry 500 is the data values 502, with each data value 502 being associated with a sign 501.

As shown, each data value 502 is paired with a weight 504. An input block is generated by applying addition circuitry 520 to the data value 502 and the weight 504, and by applying a xor circuitry 510 to the signs 501 of the data value 502 and the sign 503 of the weight 504. Circuitry 530 sorts the input blocks. Circuitry 540 cancels any opposite signed input blocks (generated by the sorting of circuitry 530). The $K^{th}$ largest value 550 of the output of circuitry 540 is provided as the output of the layer 500. K is a positive integer.

As used herein, xor (exclusive or) is a Boolean operation. A xor B=TRUE if either A or B, but not both A and B are TRUE. A xor B=FALSE if either A and B are both FALSE, or A and B are both TRUE. Xor also encompasses its plain and ordinary meaning.

As shown in FIG. 5, the layer of the multiplier-less neural network is implemented in hardware (the circuitry 500). However, in alternative embodiments, software stored in memory can be used to implement a layer that performs the functions of the layer 500.

Figure 6:
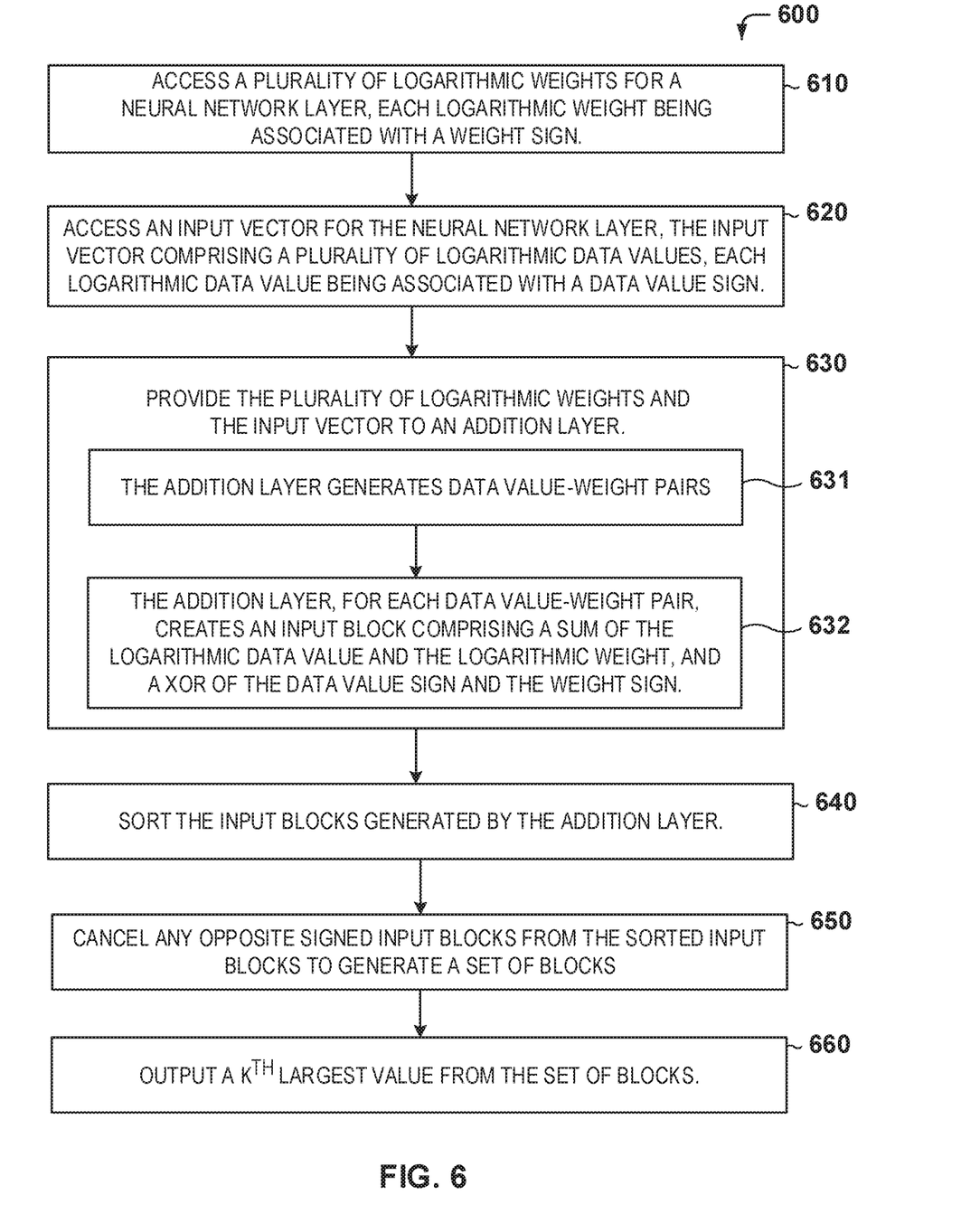
FIG. 6 is a flow chart of a method for executing a layer of a multiplier-less neural network, in accordance with some embodiments.

FIG. 6 is a flow chart of a method 600 for executing a layer of a multiplier-less neural network, in accordance with some embodiments. The method 600 may be performed by processing circuitry, for instance, the circuitry 500.

At operation 610, the processing circuitry accesses a plurality of logarithmic weights 504 for a neural network layer. Each logarithmic weight is associated with a weight sign 503.

At operation 620, the processing circuitry accesses an input vector for the neural network layer. The input vector includes a plurality of logarithmic data values 502. Each logarithmic data value 502 is associated with a logarithmic data value sign 501. In some cases, the processing circuitry accesses a numeric input to a neural network. The processing circuitry computes the input vector based on a logarithm of the numeric input.

At operation 630, the processing circuitry provides the plurality of logarithmic weights 504 and the input vector to an addition layer. At operation 631, the addition layer generates data value-weight pairs, with each data value-weight pair including at least one logarithmic data value 502 and at least one logarithmic weight 504. At operation 632, the addition layer, for each data value-weight pair, creates an input block comprising a sum of the logarithmic data value 502 and the logarithmic weight 504, and a xor of the data value sign 501 and the weight sign 503. The addition layer may be implemented using an adder circuit in the processing circuitry, e.g. addition circuitry 520. The xor operation may be implemented using an xor circuit in the processing circuitry, e.g., xor circuitry 510. Alternatively, the addition layer and/or the xor operation may be implemented in software stored in memory.

At operation 640, the processing circuitry sorts the input blocks generated by the addition layer. The sorting technique may include inputting one input per clock cycle and reordering the previously stored values. Each adder feeds a sort block, analogous to the accumulator, which accumulates one input per cycle. All inputs may be sorted in one clock cycle pipelined in multiple clock cycles. N adders may feed one sort block, where N is a positive integer. This may maximize processing throughput per resources required. The sorting operation may be implemented using a sorting circuit in the processing circuitry, e.g., sorting circuitry 530, or may be implemented in software stored in memory.

At operation 650, the processing circuitry cancels any opposite signed input blocks from the sorted input blocks (generated by operation 640) to generate a set of blocks. The cancelation operation may be implemented using a canceling circuit in the processing circuitry, e.g., canceling circuitry 540, or may be implemented in software stored in memory.

At operation 660, the processing circuitry outputs the $K^{th}$ largest value from the set of blocks. K is a positive integer. The $K^{th}$ largest value may be an input to an additional addition layer (different from that of operation 630). The value of K may be determined based on input statistics of the data. The input statistics may include a distribution of the data. The $K^{th}$ largest value may correspond to an activation energy of the neural network layer. After operation 660, the method 600 ends. In some cases, the value of K may depend upon the statistics of the input data, and may be determined empirically.

In one example, for a 5×5 tile, the input is 25*4 bits plus a sign bit (125 bits total) into the block per clock cycle. 25 coefficients are stored in the compute block, and updated as needed. Data is inputted in each clock cycle, and the result is outputted in each clock cycle. The latency can be multiple cycles. First, sorting is done according to magnitude, without regard to the sign. Then, adjacent values of the opposite sign are cancelled. The output is the $K^{th}$ largest magnitude value, representing a value proportional to convolution. In some cases, the average of multiple values may be provided (e.g., average of $K^{th}$, $K+1^{th}$, and $K+2^{th}$ values).

Aspects of the technology described herein are directed to a more efficient (less circuit area, less power consumption) technique for implementing a CNN, which is the core operator in most machine learning algorithms. Other approaches to improve efficiency involve reducing precision and therefore dynamic range. Some of the techniques disclosed herein provide an efficiency boost while preserving dynamic range.

Some aspect of the technology disclosed herein relate to a technique to perform CNN in machine learning to reduce circuit area and power consumption, without, in some cases, compromising dynamic range as a simple reduction in bit representation may do. Some aspects include logarithmic numerical representation, which provides for high dynamic range with small bit width. This reduces memory requirements. Some aspects include the use of adders rather than multipliers, saving area and power. Some aspects use a $K^{th}$ largest value (e.g. $K^{th}$ median sort function). The value of K may be empirically determined and may depend upon statistical distribution of input data. Some aspects include the removal of like magnitude products of opposite sign to be performed after sorting but before selection of the $K^{th}$ largest value to further improve approximation of accumulation functionality. Some aspects include an expectation that they may be used for inference (feedforward path) especially in embedded applications which power and circuit area is important. Some aspects may be used in training that is employed at a higher precision logarithmic representation in a feedback path.

Some aspects of the techniques described herein use a logarithmic form of data representation. In some aspects, the logarithmic representation allows for large dynamic range of values with small word size, and reduces memory usage. In some aspects, multiply operations become addition, causing large savings in circuit area and power. In some aspects, traditional accumulation of products might not be possible. Instead energy of sum of products, estimated by a $K^{th}$ largest value ($K^{th}$ median sort function), is used. The value of K may depend upon input data statistical distribution. In some aspects, for fully connected layers with large accumulation of products, a hierarchical sort tree can be used. In some aspects, an additional benefit is sort is inherently non-linear, which is one type of operation needed in CNN processing. In some cases, a traditional CNN is modified by replacing multiplication with addition, and accumulation with sorting.

Figure 7:
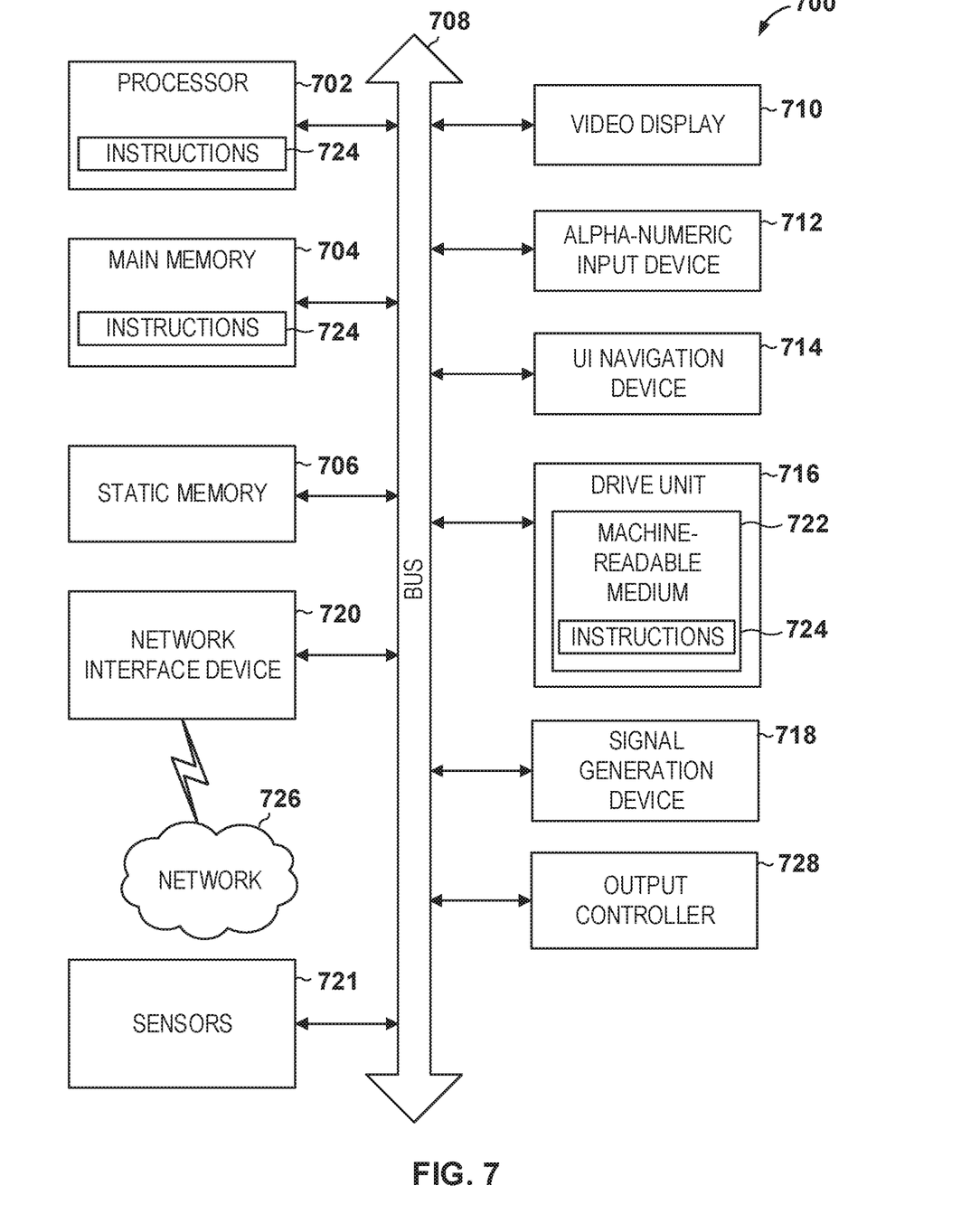
FIG. 7 is a block diagram of a computing machine, in accordance with some embodiments.

FIG. 7 illustrates a block diagram of a computing machine 700 in accordance with some embodiments. In some embodiments, the computing machine 700 may store the components shown in the circuit block diagram of FIG. 5. For example, the circuitry 500 may reside in the processor 702. In some embodiments, the computing machine 700 may perform the method 600 of FIG. 6. Instructions for performing the method 600 may be hard-wired into the processor 702 or stored in one of the memory/storage units 1104 or 1122. In alternative embodiments, the computing machine 700 may operate as a standalone device or may be connected (e.g., networked) to other computers. In a networked deployment, the computing machine 700 may operate in the capacity of a server, a client, or both in server-client network environments. In an example, the computing machine 700 may act as a peer machine in peer-to-peer (P2P) (or other distributed) network environment. In this document, the phrases P2P, device-to-device (D2D) and sidelink may be used interchangeably. The computing machine 700 may be a specialized computer, a personal computer (PC), a tablet PC, a personal digital assistant (PDA), a mobile telephone, a smart phone, a web appliance, a network router, switch or bridge, or any machine capable of executing instructions (sequential or otherwise) that specify actions to be taken by that machine.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems/apparatus (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The computing machine 700 may include a hardware processor 702 (e.g., a central processing unit (CPU), a GPU, a hardware processor core, or any combination thereof), a main memory 704 and a static memory 706, some or all of which may communicate with each other via an interlink (e.g., bus) 708. Although not shown, the main memory 704 may contain any or all of removable storage and non-removable storage, volatile memory or non-volatile memory. The computing machine 700 may further include a video display unit 710 (or other display unit), an alphanumeric input device 712 (e.g., a keyboard), and a user interface (UI) navigation device 714 (e.g., a mouse). In an example, the display unit 710, input device 712 and UI navigation device 714 may be a touch screen display. The computing machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The computing machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The drive unit 716 (e.g., a storage device) may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the computing machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the computing machine 700 and that cause the computing machine 700 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 720 may include one or more physical jacks (e.g., Ethernet, coaxial, or phone jacks) or one or more antennas to connect to the communications network 726.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, user equipment (UE), article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A neural network apparatus, the apparatus comprising: processing circuitry configured to:
   access, a plurality of weights for a neural network layer, each weight being associated with a weight sign;
   access an input vector for the neural network layer, the input vector comprising a plurality of data values, each data value being associated with a data value sign; and
   provide the plurality of weights and the input vector to an addition layer including adder circuitry and xor circuitry;
   the adder circuitry is configured to receive the plurality of weights and the input vector such that when the addition layer generates data value-weight pairs, the adder circuitry creates an input block comprising a sum of the data value and the weight for each data-value weight pair; and
   the xor circuitry is configured to receive the plurality of weights and the input vector such that when the addition layer generates data value-weight pairs, the xor circuitry creates the input block further comprising a xor (exclusive or) of the data value sign and the weight sign for each data-value weight pair; and
   the processing circuitry is further configured to:
      sort the input blocks generated by the addition layer;
      cancel any opposite signed input blocks having a same magnitude from the sorted input blocks to generate a set of blocks; and
      output a $K^{th}$ largest value from the set of blocks, wherein K is a positive integer.

2. The apparatus of claim 1, wherein the $K^{th}$ largest value is a part of an input to an additional addition layer.

3. The apparatus of claim 1, wherein the processing circuitry is configured to access the input vector by:
   accessing a numeric input to a neural network; and
   computing the input vector based on a logarithm of the numeric input.

4. The apparatus of claim 1, wherein K is determined based on input statistics of the data.

5. The apparatus of claim 4, wherein the input statistics include a distribution of the data.

6. The apparatus of claim 1, wherein the $K^{th}$ largest value corresponds to an activation energy of the neural network layer.

7. A non-transitory machine-readable medium for executing a neural network, the machine-readable medium storing instructions which, when executed by processing circuitry of one or more machines, cause the processing circuitry to:
   access a plurality of weights for a neural network layer, each weight being associated with a weight sign;
   access an input vector for the neural network layer, the input vector comprising a plurality of data values, each data value being associated with a data value sign;
   provide the plurality of weights and the input vector to an addition layer comprising an adder circuit and an xor circuit;
   provide the plurality of weights and the input vector to the adder circuit such that when the addition layer generates data value-weight pairs, the adder circuit creates an input block comprising a sum of the data value and the weight for each data-value weight pair;
   provide the plurality of weights and the input vector to an xor circuit such that when the addition layer generates data value-weight pairs, the xor circuit creates the input block further comprising a xor (exclusive or) of the data value sign and the weight sign for each data-value weight pair;
   sort the input blocks generated by the addition layer;
   cancel any opposite signed input blocks having a same magnitude from the sorted input blocks to generate a set of blocks; and
   output a $K^{th}$ largest value from the set of blocks, wherein K is a positive integer.

8. The machine-readable medium of claim 7, wherein the $K^t$ largest value is a part of an input to an additional addition layer.

9. The machine-readable medium of claim 7, wherein the processing circuitry is to access the input vector by:
   accessing a numeric input to a neural network; and
   computing the input vector based on a logarithm of the numeric input.

10. The machine-readable medium of claim 7, wherein K is determined based on input statistics of the data.

11. The machine-readable medium of claim 10, wherein the input statistics include a distribution of the data.

12. The machine-readable medium of claim 7, wherein the $K^t$ largest value corresponds to an activation energy of the neural network layer.

13. A neural network method comprising:
   accessing, by processing circuitry of a machine, a plurality of weights for a neural network layer, each weight being associated with a weight sign;
   accessing, by the processing circuitry, an input vector for the neural network layer, the input vector comprising a plurality of data values, each data value being associated with a data value sign;
   providing, by the processing circuitry, the plurality of weights and the input vector to an addition layer comprising an adder circuit and an xor circuit;
   receiving, by the adder circuit, the plurality of weights and the input vector such that when the adder circuit generates data value-weight pairs, the adder circuit creates an input block comprising a sum of the data value and the weight for each data-value weight pair;
   receiving, by an xor circuit, the plurality of weights and the input vector such that when the adder circuit generates data value-weight pairs, the xor circuit creates the input block further comprising a xor (exclusive or) of the data value sign and the weight sign for each data-value weight pair;
   sorting, by the processing circuitry, the input blocks generated by the adder circuit;
   cancelling, by the processing circuitry, any opposite signed input blocks having a same magnitude from the sorted input blocks to generate a set of blocks; and outputting, by the processing circuitry, a $K^{th}$ largest value from the set of blocks, wherein K is a positive integer.

14. The method of claim 13, wherein the $K^{th}$ largest value is a part of an input to an additional addition layer.

15. The method of claim 13, wherein the processing circuitry is to access the input vector by:
accessing a numeric input to a neural network; and
computing the input vector based on a logarithm of the numeric input.

16. The method of claim 13, wherein K is determined based on input statistics of the data.

17. The method of claim 16, wherein the input statistics include a distribution of the data.

18. The method of claim 13, wherein the $K^{th}$ largest value corresponds to an activation energy of the neural network layer.

* * * * *